United States Patent
Rokicki

(10) Patent No.: US 10,725,965 B1
(45) Date of Patent: Jul. 28, 2020

(54) SYSTEMS AND METHODS FOR MANAGING COPY CREATION AND DELETION

(71) Applicant: EMC IP Holding Company LLC, Hopkinton, MA (US)

(72) Inventor: John Rokicki, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 251 days.

(21) Appl. No.: 15/282,906

(22) Filed: Sep. 30, 2016

(51) Int. Cl.
- *G06F 16/00* (2019.01)
- *G06F 16/11* (2019.01)
- *G06F 16/16* (2019.01)
- *G06F 16/215* (2019.01)

(52) U.S. Cl.
CPC .......... *G06F 16/125* (2019.01); *G06F 16/162* (2019.01); *G06F 16/215* (2019.01)

(58) Field of Classification Search
CPC combination set(s) only.
See application file for complete search history.

(56) References Cited

U.S. PATENT DOCUMENTS

| | | | | |
|---|---|---|---|---|
| 8,285,898 B2 * | 10/2012 | Amit | ........................ | G06F 16/00 710/68 |
| 8,327,050 B2 * | 12/2012 | Amit | ........................ | G06F 16/00 710/68 |
| 8,473,652 B2 * | 6/2013 | Amit | ........................ | G06F 16/00 710/68 |
| 8,656,075 B2 * | 2/2014 | Amit | ........................ | G06F 16/00 710/68 |
| 8,677,039 B2 * | 3/2014 | Amit | ........................ | G06F 16/00 710/68 |
| 8,799,245 B2 * | 8/2014 | Amarendran | ........... | G06F 16/21 707/694 |
| 8,805,806 B2 * | 8/2014 | Amarendran | ........... | G06F 16/21 707/694 |
| 9,563,514 B2 * | 2/2017 | Dornemann | ........ | G06F 9/45558 |
| 9,646,256 B2 * | 5/2017 | Chamness | ........... | G06F 16/2365 |
| 9,760,446 B2 * | 9/2017 | Hammer | ................ | G06F 16/00 |
| 2008/0177994 A1 * | 7/2008 | Mayer | ................... | G06F 9/4418 713/2 |
| 2010/0036895 A1 * | 2/2010 | Boyd | .................. | G06F 16/1873 707/E17.007 |
| 2011/0218970 A1 * | 9/2011 | Amit | ........................ | G06F 16/00 707/679 |
| 2011/0218975 A1 * | 9/2011 | Amit | ........................ | G06F 16/00 707/693 |

(Continued)

*Primary Examiner* — Farhan M Syed
(74) *Attorney, Agent, or Firm* — Staniford Tomita LLP

(57) ABSTRACT

Definitions are received for allowable activity windows and epochs. Each epoch specifies a retention duration and allowable activity window. There can be a retention policy specifying that copies created during a particular time period of the allowable activity window are to be retained past a retention duration of an initial epoch. A determination is made as to whether a copy was created during the particular time period specified in the retention policy. If the copy was not created during the particular time period, the retention duration of the initial epoch is added to a creation time of the copy to obtain a date after which the copy should be deleted. If the copy was created during the particular time period, a retention duration of a subsequent epoch is added to the creation time to obtain the date. The date is then associated with the copy.

14 Claims, 9 Drawing Sheets

(56) References Cited

U.S. PATENT DOCUMENTS

| | | | | |
|---|---|---|---|---|
| 2011/0219144 A1* | 9/2011 | Amit | ........................ | G06F 16/00 |
| | | | | 709/247 |
| 2012/0265740 A1* | 10/2012 | Amit | ........................ | G06F 16/00 |
| | | | | 707/693 |
| 2013/0238563 A1* | 9/2013 | Amarendran | ........... | G06F 16/21 |
| | | | | 707/654 |
| 2013/0238575 A1* | 9/2013 | Amarendran | ........... | G06F 16/21 |
| | | | | 707/694 |
| 2014/0344234 A1* | 11/2014 | Amarendran | ....... | G06F 11/1458 |
| | | | | 707/694 |
| 2015/0143064 A1* | 5/2015 | Bhargava | ............ | G06F 11/1451 |
| | | | | 711/162 |
| 2015/0199367 A1* | 7/2015 | Hammer | ............. | G06F 16/1748 |
| | | | | 707/654 |
| 2015/0363270 A1* | 12/2015 | Hammer | ............. | G06F 11/1451 |
| | | | | 711/162 |
| 2015/0370641 A1* | 12/2015 | Susairaj | ................. | G06F 3/0619 |
| | | | | 707/645 |
| 2016/0170844 A1* | 6/2016 | Long | ........................ | G06F 16/21 |
| | | | | 707/679 |
| 2016/0292041 A1* | 10/2016 | Bender | ............... | G06F 11/1435 |
| 2016/0350391 A1* | 12/2016 | Vijayan | ..................... | G06F 3/0619 |
| 2016/0371153 A1* | 12/2016 | Dornemann | ......... | G06F 11/1464 |
| 2017/0090974 A1* | 3/2017 | Dornemann | ......... | G06F 11/1456 |
| 2018/0074910 A1* | 3/2018 | Hammer | ............. | G06F 11/1458 |

\* cited by examiner

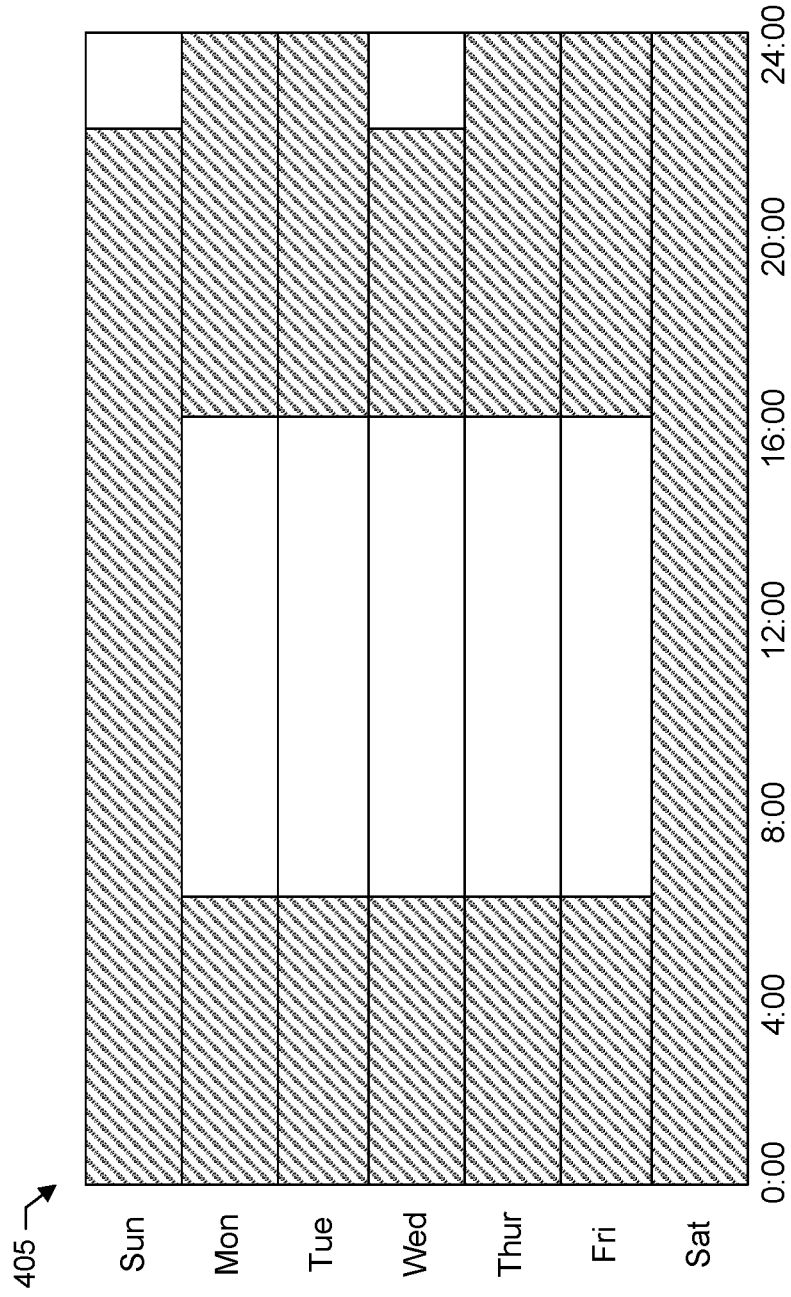

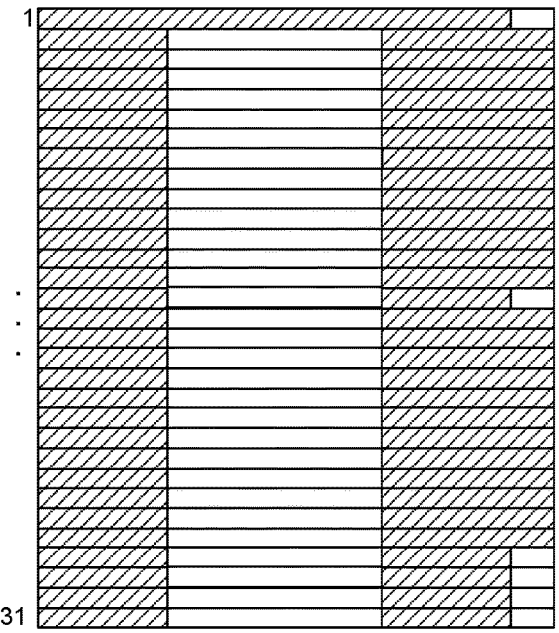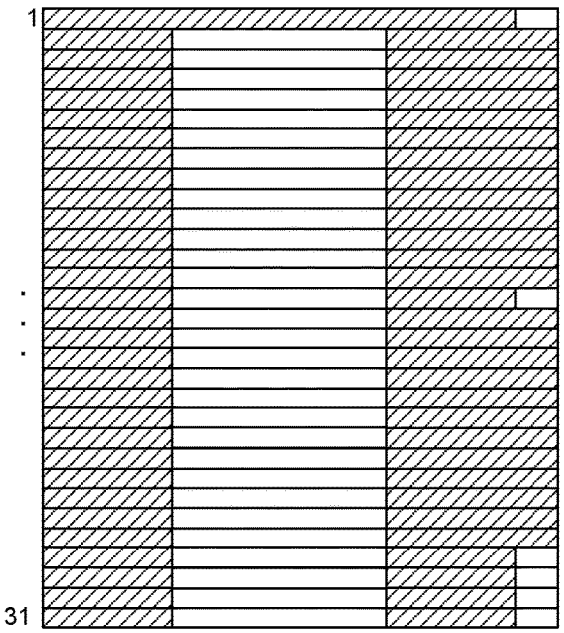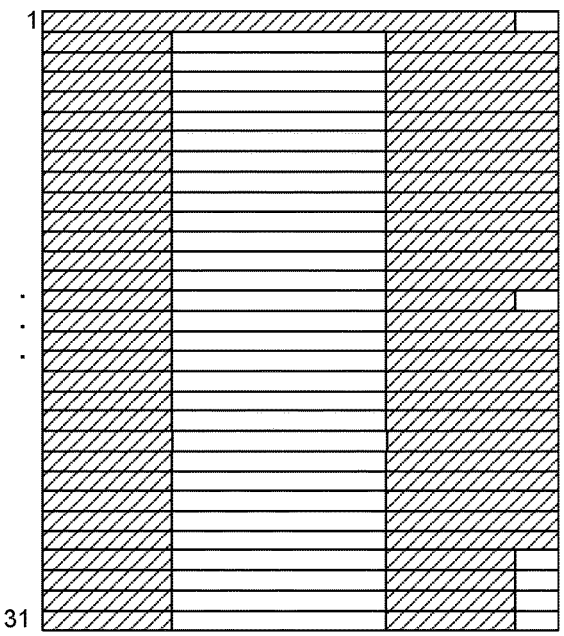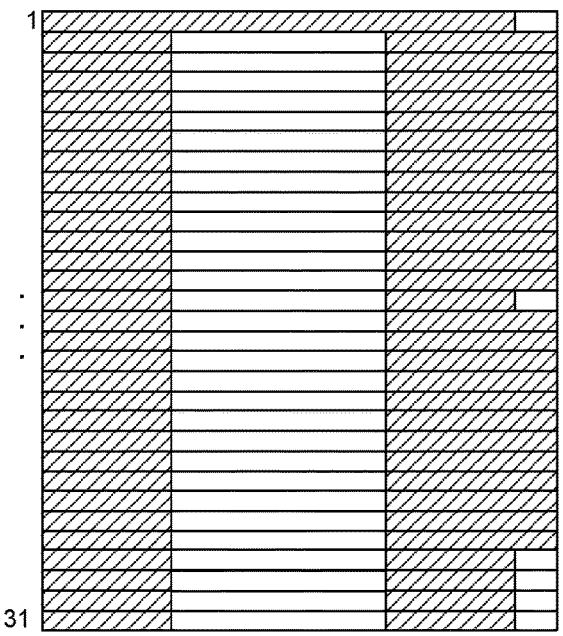
605
FIG. 6

SYSTEMS AND METHODS FOR MANAGING COPY CREATION AND DELETION

TECHNICAL FIELD

Embodiments are generally directed to data management, and more specifically to calculating when data may be deleted.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Organizations including companies, businesses, institutions, and the like collect and generate a vast amount of data. The data may include documents, reports, video, music, social media postings, emails, medical records, customer transactions, financial records, and so forth.

Since data plays such a vital role in the functioning of an organization, it is important that there be copies of data such as backup copies in the event of a disaster. In addition to backup copies, organizations often make copies for other purposes such as for analytics, reporting, and testing.

An organization may wish to maintain the data including copies of the data for a certain period of time after their creation. In some cases, a retention period is mandated by law. The copies, if left unchecked, however, can cause an organization's storage costs to spiral out-of-control. Different copies may have varying degrees of importance and the importance can change with the passage of time. There is a need for improved systems and techniques that reflect these understandings when calculating final data retention dates in order to more efficiently manage data growth.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 shows an example of a daily duration activity window, under some embodiments.

FIG. 4 shows an example of a weekly duration, under some embodiments.

FIG. 6 shows an example of a yearly duration, under some embodiments.

DETAILED DESCRIPTION

Figure 1:
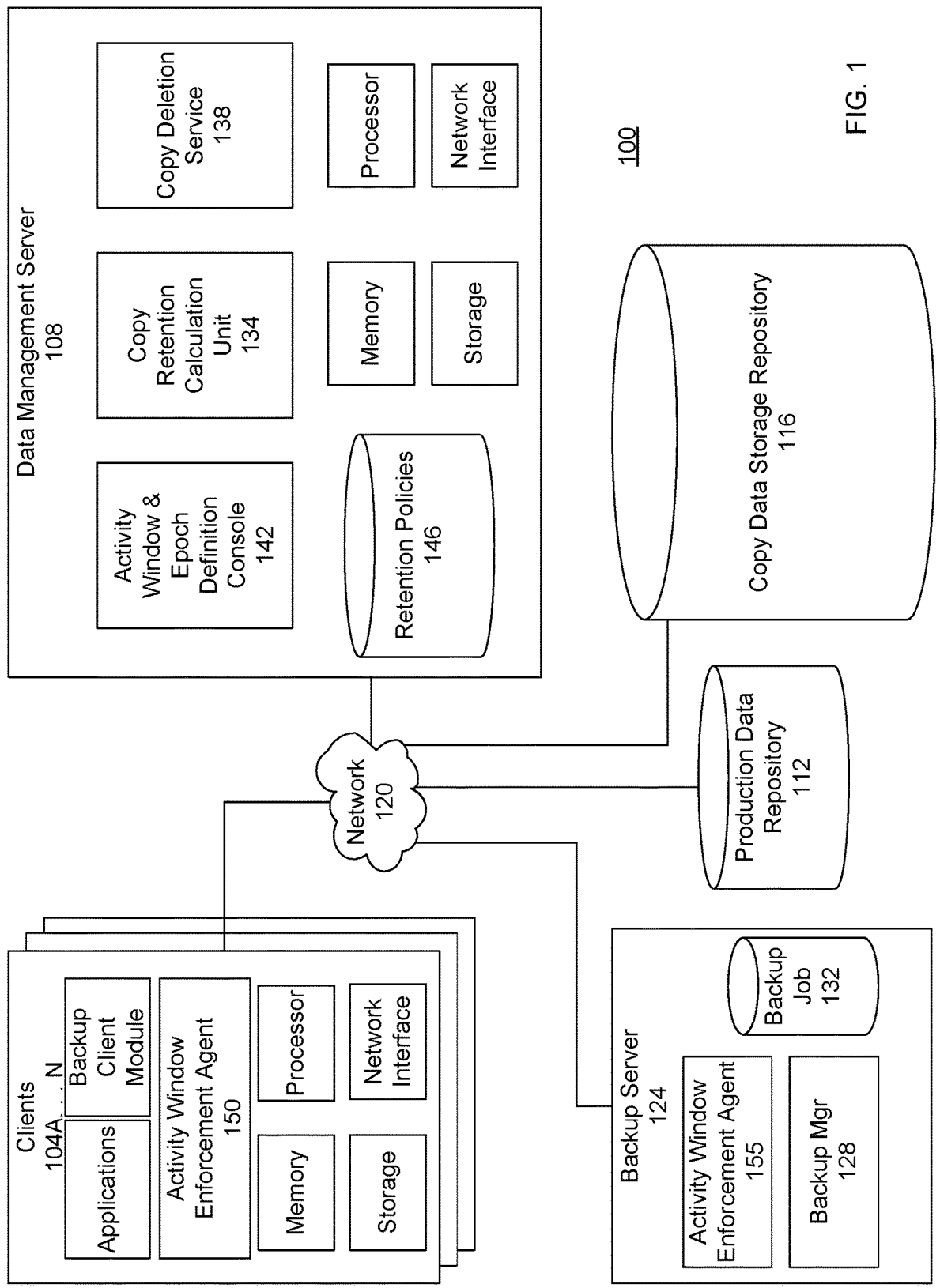
FIG. 1 is a diagram of a large-scale network implementing a system for calculating final data retention dates, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a non-transitory computer-usable medium having a computer-readable program code embodied therein. In the context of this disclosure, a non-transitory computer-usable medium or computer-readable medium may be any physical medium that can contain or store the program for use by or in connection with the instruction execution system, apparatus or device. For example, the non-transitory computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for calculating final data retention dates based on activity windows. Some embodiments of the invention may involve a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a simplified block diagram of a computing environment 100 that implements one or more embodiments of a system for calculating final data retention dates. The environment shown in FIG. 1 includes any number of clients (e.g., client 104A . . . N), a data management server 108, a production data repository 112, and a copy data storage repository 116, each of which are interconnected by a network 120. The environment may further include a backup server 124.

The network provides connectivity to the various systems, components, and resources of the distributed computer network shown in FIG. 1. The network may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The clients and servers can be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

The production data repository stores production data. Production data may be include data supporting the daily operations and functions of an enterprise or other organization. For example, the data may include databases (e.g., Oracle Database, Microsoft Exchange Database file, customer relationship management (CRM) database), applications including enterprise applications, any number of documents, files, and so forth.

The copy data storage repository stores copies of data. The copies may include copies of the production instance. The copies may include backup copies. For example, in a specific embodiment, there can be the backup server having a backup manager 128 which accesses a backup job 132. The backup job may specify the parameters for backing-up a client. The parameters may include, for example, a location of the data to be backed up, backup schedule, backup type, and so forth. The backup manager processes the backup job and coordinates with the backup client modules in order to create backup copies. The copies may then be stored in the copy data storage repository. There can be many different types of backup copies such as full backups, incremental backups, replicas, disaster recovery (DR) copies, snapshot backups, and so forth.

There can be copies made for purposes instead of or in addition to data protection. For example, copies may have been made for analytical purposes, data mining, business intelligence gathering, statistical calculations, reporting, IT operations, quality assurance and quality control (QA/QC), patch testing, backwards compatibility testing, new product version testing, development purposes, and so forth.

Creating copy after copy of documents, files, and other electronic records can overwhelm an organization's storage resources, degrade network performance, and impact the responsiveness of other applications and services. Excessive copy sprawl can cost businesses tens, hundreds, or even millions of dollars per year in storage costs, maintenance costs, and reduce overall productivity.

In a specific embodiment, a methodology is provided by which a final retention date of an item, such as a copy of data, is calculated given the maximum time into the future and the limits placed on that time by a set of "allowable activity windows." In this specific embodiment, an "allowable activity window" specifies time periods of a certain duration (daily, weekly, monthly for example) when artifacts of activity are to remain. Overlaying these potentially repeating windows of allowable activity between a certain date, such as the date a copy was made, and the maximum possible time span from that date, yields time ranges that indicate the maximum time a copy should be retained. Applying such intelligence to retention helps to reduce overall system resource consumption, simplify resource management, and take the guess work out of how long something should be retained given a complex set of time constraints.

In other words, an activity window can express with respect to time when activity (e.g., system activity) such as backup or copy activity should and should not be performed. In an embodiment, an activity window is applied towards defining or calculating how long a data item such as a copy should be maintained or retained based on various objectives to be met. For example, one objective may be that some copies (e.g., records relevant to financial audits) are to be kept for 7 years. Another objective may be that other copies only need to be kept for 1 week.

More particularly, as shown in the example of FIG. 1, the data management server may include a copy retention calculation unit 134, copy deletion service 138, an activity window and epoch definition console 142, and retention policies 146. It should be appreciated that the components and modules shown in FIG. 1 can be functional entities where implementation of the functions can vary and there can be many different hardware and software configurations. For example, the copy retention calculation unit and copy deletion service may be combined into one code module. In other cases, the retention calculation unit and deletion service reside in separate code modules.

The copy retention calculation unit is responsible for calculating, upon creation of a copy, a date on or after which the copy should be deleted. The date is tagged, linked, or associated with the copy. The date may stored as an attribute of the file. The date may be stored in an index or catalog. For example, Table A below shows an example of some metadata that may be stored in a catalog to track the various copies. The catalog may be stored and maintained by the data management server.

TABLE A

| Copy Name | Date Created | Retain Until Date |
|---|---|---|
| Exchange DB Backup 1 | 00:00, Mon., Jan. 6, 2013 | 00:00 (midnight) between Mon., Jan. 5 and Tues., Jan. 6, 2015 |
| Exchange DB Backup 2 | 04:00, Mon., Jan. 6, 2013 | 04:00, Sun., Jan. 13, 2013 |
| Exchange DB Backup 3 | 16:00, Mon., Jan. 6, 2013 | 16:00, Sun., Jan. 13, 2013 |
| Exchange DB Backup 4 | 20:00, Mon., Jan. 6, 2013 | 20:00, Sun., Jan. 13, 2013 |
| Exchange DB Backup 5 | 00:00, Tues., Jan. 7, 2013 | 00:00 (midnight) between Sun., Jan. 13 and Mon. Jan. 14, 2013 |
| Exchange DB Backup 6 | 04:00, Tues., Jan. 7, 2013 | 04:00, Mon., Jan. 14, 2013 |
| Exchange DB Backup 7 | 16:00, Tues., Jan. 7, 2013 | 16:00, Mon. Jan. 14, 2013 |
| . . . | . . . | . . . |

Table A above includes columns labeled "Copy Name," "Date Created," and "Retain Until Date." The "Copy Name" column stores the name of the copy. The "Date Created" column stores the time and date the copy was created. The "Retain Until Date" stores the date on or after which the copy should be deleted.

For example, as shown in the sample data above, a first backup of an Exchange Database was created at midnight on Monday, Jan. 6, 2013. The first backup is to be retained for two years until midnight between Monday, January 5 and Tuesday, Jan. 6, 2015. A second backup of the Exchange Database was created at 04:00 hours (4:00 PM) on Monday, Jan. 6, 2013. The second backup is to be retained for 1 week until 04:00 hours, Sunday, Jan. 13, 2013. A third backup of the Exchange Database was created at 16:00 hours (4:00 PM) on Monday, Jan. 6, 2013. The third backup is to be retained for 1 week until 16:00 hours, Sunday, Jan. 13, 2013. A fourth backup of the Exchange Database was created at 20:00 hours (8:00 PM) on Monday, Jan. 6, 2013. The fourth backup is to be retained for 1 week until 20:00 hours, Sunday, Jan. 13, 2013. A fifth backup of the Exchange Database was created at midnight on Tuesday, Jan. 7, 2013. The fifth backup is to be retained for 1 week until midnight between Sunday, January 13 and Monday, Jan. 14, 2013. A sixth backup of the Exchange Database was created at 04:00 hours (4:00 AM) on Tuesday, Jan. 7, 2013. The sixth backup is to be retained for 1 week until 04:00 hours, Monday, Jan. 14, 2013. A seventh backup of the Exchange Database was created at 16:00 hours (4:00 PM) on Tuesday, Jan. 7, 2013. The seventh backup is to be retained for 1 week until 16:00 hours, Monday, Jan. 14, 2013.

In an embodiment, systems and techniques are provided that allow for different retention periods or durations for different copies. In a specific embodiment, in determining the date after which a copy such as a backup copy should be deleted, the system can determine, examine, identify, or analyze the context under which the copy was created. Context factors can include a particular time of day in which a backup of a file was made (e.g., midnight or 4:00 PM), a particular day of a week in which the backup was made (e.g., Monday, Tuesday, Wednesday, Thursday, Friday, Saturday, or Sunday), a particular day of a month in which the backup was made (e.g., first Monday of the month, second Thursday of the month), a particular week of a month in which the backup was made (e.g., first week of the month, last week of the month), a particular month of a year in which the backup was made (e.g., January, February, March, April, May, June, July, August, September, October, November, or December), other factors, or combinations of these. For example, the sample "retain until" dates shown in Table A above may be based on evaluation of a retention policy specifying that backup copies are to be retained for a week, but the first Monday copy of each month is to be kept for two years.

Thus, rather than using a fixed retention time for all things retained, the system allows for a more selective process of choosing what to retain based on other elements of time, such as when the retained item was created. In a specific embodiment, a method allows for more selective time-based pruning of retained items, favoring some copies over others due to time-based properties, such as when the item was created.

The copy deletion service is responsible for deleting the copies from the copy data storage repository. For example, the service may run as a background service during off-peak hours (e.g., nightly or on weekends). The service may compare a current date with the retain until date of a copy. If the current date is after the retain until date, the copy may be deleted. If the current date is before the retain until date, the copy may be preserved, maintained, or kept.

The definition console provides a user interface or graphical user interface (GUI) through which a user or administrator may use to configure, define, or specify activity windows and epochs. The activity windows and epochs may be based on a data retention policy. In a specific embodiment, an activity window controls when copy activity can occur and how long a copy should be retained. For example, making copy of data whether the copy is for backup, analytics, reporting, data mining, and so forth can consume a large amount of computing resources depending upon the size of the data or file to be copied. A database, such as a flight reservation system for example, may be many gigabytes or terabytes in size. Copying such a large file in the middle of the workday may divert computing resources away from other production tasks that may be more critical such as ensuring the responsiveness of a customer application, messaging between mission-critical production application components, and so forth.

In a specific embodiment, activity windows define time periods which are allowable for activity to occur. These "activity windows" are useful for the system as a whole for controlling all work (blackout windows), as well as specific uses for limiting when copies or plan protection occurs (objectives). An activity window may specify the starting and ending times of a day in which copy activity is allowed or should occur. In a specific embodiment, there can be activity window enforcement agents such as enforcement agent 150 deployed at the client, and enforcement agent 155 deployed at the backup sever. The enforcement agents are responsible for enforcement of the activity windows. An enforcement agent may block attempts to make a copy of a file depending on when the attempt is made.

For example, an activity window may specify that copies should not be made during the middle of a work day (e.g., no copying allowed between the hours of 6:00 AM and 4:00 PM) in order to dedicate system resources to servicing customer requests. Copying, however, may be allowed outside these hours. If an enforcement agent detects an attempt by a user to make a copy during the middle of the work day (as defined by an activity window), the enforcement agent may block the attempt. The enforcement agent may display on an electronic screen a message to the user indicating that copying is not permitted between 6:00 AM and 4:00 PM and requesting that the user make the copy outside these hours.

In a specific embodiment, activity windows can further drive copy deletion and pruning strategies over time. In a specific embodiment, an activity window is a start and end time where work can be performed. An activity window can have a particular duration, covering times during a day, week, month and year.

Figure 2:
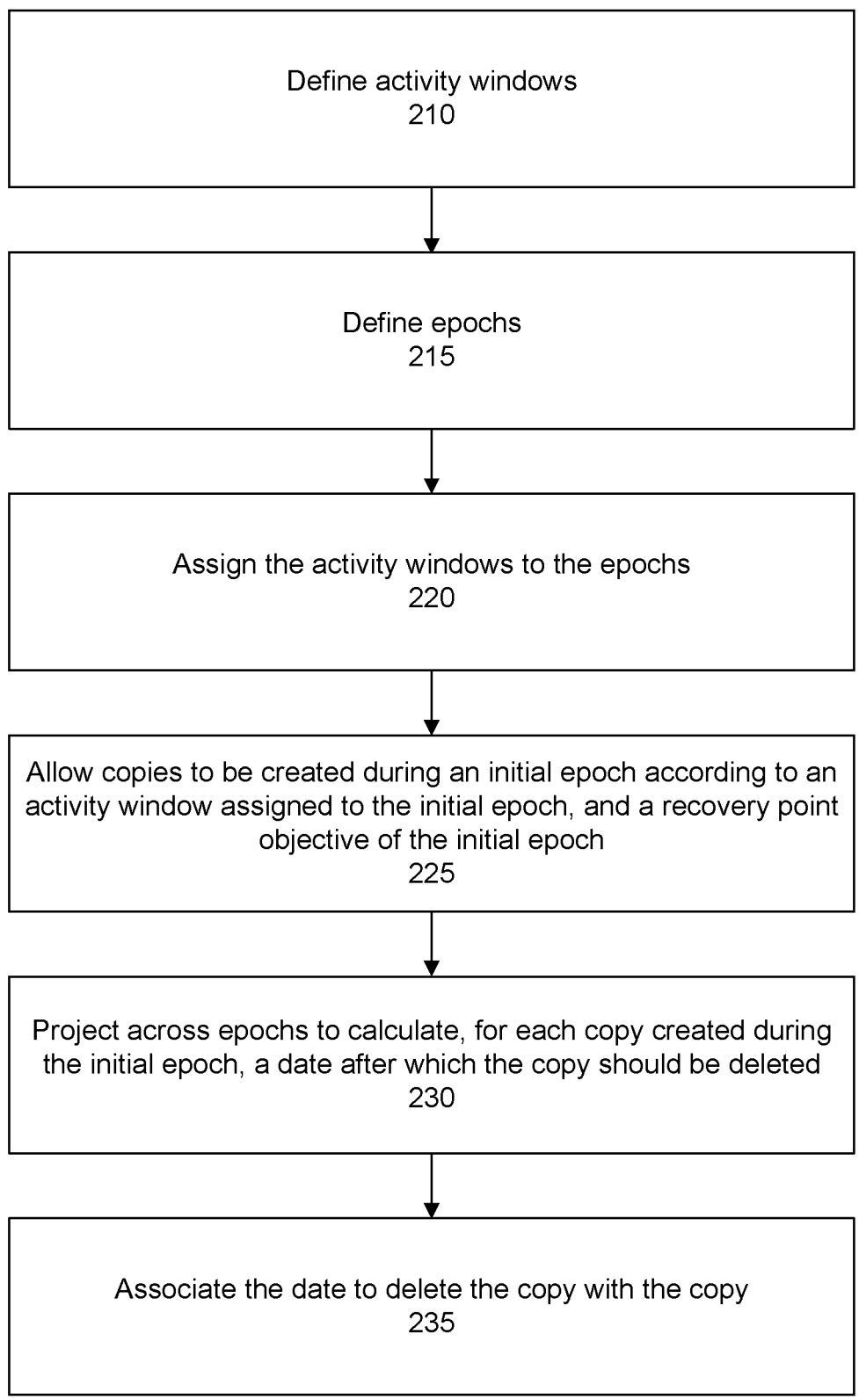
FIG. 2 shows an overall flow of a process for calculating final data retention dates, under some embodiments.

FIG. 2 shows an overall flow for calculating final data retention dates based on activity windows. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210 definitions of activity windows are received. In a step 215, definitions of epochs are received. In a step 220, activity windows are assigned to epochs. For example, an IT administrator may use the definition console to specify the times of an activity window, a duration of an epoch, and assign the activity window to the epoch. In a step 225, copies are allowed to be created during a first or initial epoch according to an activity window assigned to the initial epoch, and a recovery point objective of the initial epoch. In a step 230, the system or retention calculation unit projects across the epochs to calculate, for each copy created during the initial epoch, a date on or after which the copy should be deleted. In a step 235, the system associates the date to delete the copy with the copy.

FIG. 3 shows an example of an activity window 305 for a daily duration where one of more sets of start and end times exist or have been defined (e.g., 12 AM-6 AM, 4 PM 12 AM). In FIG. 3, a pattern of diagonal lines indicates times during the day when copy activity is allowed; and a solid fill indicates times during the day when copy activity is not allowed.

Specifically, as shown in the example of FIG. 3, a day has been divided into time ranges to indicate when copy activity is allowed (or not allowed). For example, a first time range 310 starts at the beginning of a day at 0:00 hours (12:00 AM) and ends at 06:00 hours (6:00 AM). A second time range 315 starts at 16:00 hours (4:00 PM) and ends at 24:00 hours (12:00 AM). A third time range 320 is between the first and second time ranges. In this example, copies are allowed to be made during the first and second time ranges. Copies are not allowed to made during the third time range.

FIG. 4 shows an example of a weekly duration 405. A weekly duration may be the aggregation of 7 daily duration activity windows. As in FIG. 3, a pattern of diagonal lines indicates times during the day when copy activity is allowed; and a solid fill indicates times during the day when copy activity is not allowed. Specifically, as shown in the example of FIG. 4, on Sunday, activity is allowed all day except from 22:00 hours (10:00 PM) to 24:00 hours (midnight). On Monday, Tuesday, Thursday, and Friday, activity is allowed from 0:00 hours (midnight) to 06:00 hours (6:00 AM) and from 16:00 hours (4:00 PM) to 24:00 hours (midnight). On Wednesday, activity is allowed from 0:00 hours (midnight) to 06:00 hours (6:00 AM) and from 16:00 hours (4:00 PM) to 22:00 hours (10:00 PM). On Saturday, activity is allowed all day.

Figure 5:
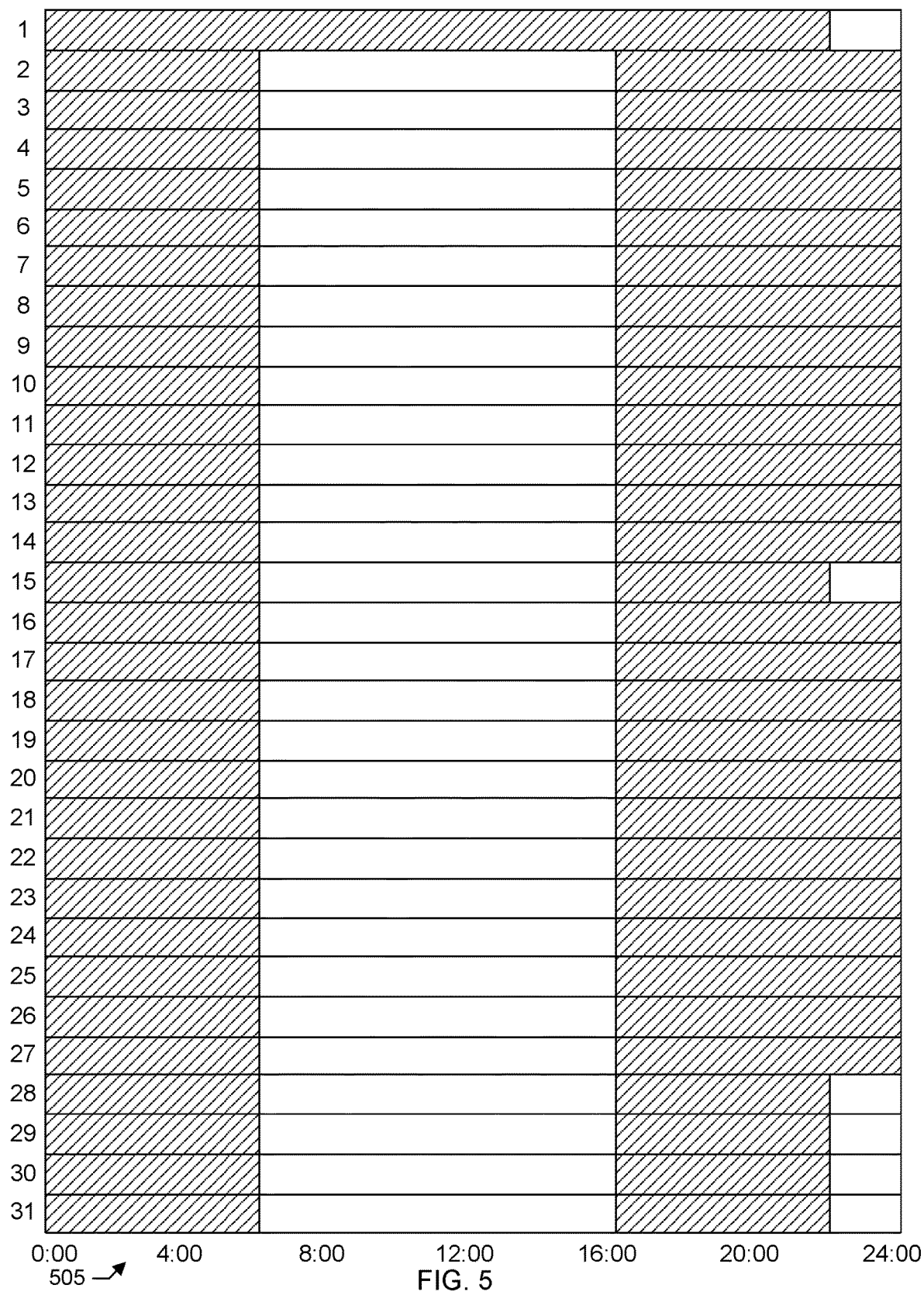
FIG. 5 shows an example of a monthly duration, under some embodiments.

FIG. 5 shows an example of a monthly duration 505. A monthly duration may be the aggregation of 31 daily duration activity windows. FIG. 6 shows an example of a yearly duration 605. A yearly duration may be an aggregation of 12 monthly duration activity windows. Some examples of other variants that may be created include a 53 week activity window to represent a year, or a 366 day activity window. Months can be up to 31 days or 5 weeks.

In a specific embodiment, an activity window may be made or defined as a resource. By making an activity window resource, the activity window may be named and reused for any number of purposes, such as blackout and maintenance periods for a system. For example, if you wish to allow work all week except for 4 hours on Sunday, create a weekly activity window for such a purpose. An activity window resource can describe the absolute times and relative days that define it.

In another specific embodiment, an activity window may be made or defined as the measure for an objective. By making an activity window the measure for an objective, when assigned to an epoch (also referred to as a stage), one could determine if all copies within that epoch were only made during the specified activity window. And all other objectives relative to time (recovery point, verification compliance, and so forth) would adhere to these time windows as well. By making an activity window an objective, one could also use the times to specify when work should be done. This would have effects on the protection operations performed by the system.

In another specific embodiment, an activity window objective is used to determine retention time. Using the activity window as an objective concept, allows for using it as a control for when work should be performed during the first or initial epoch and also as a way to determine how long a copy should be retained across all epochs. By using multiple epochs/stages for a single location, and each stage having its own activity window, the system can determine at copy creation time when the last time the copy will be needed to satisfy an activity window objective. In doing so, in systems where retention/expiration times can be set on copies, the system itself can manage the cleanup of copies automatically or without external intervention.

Figure 7:
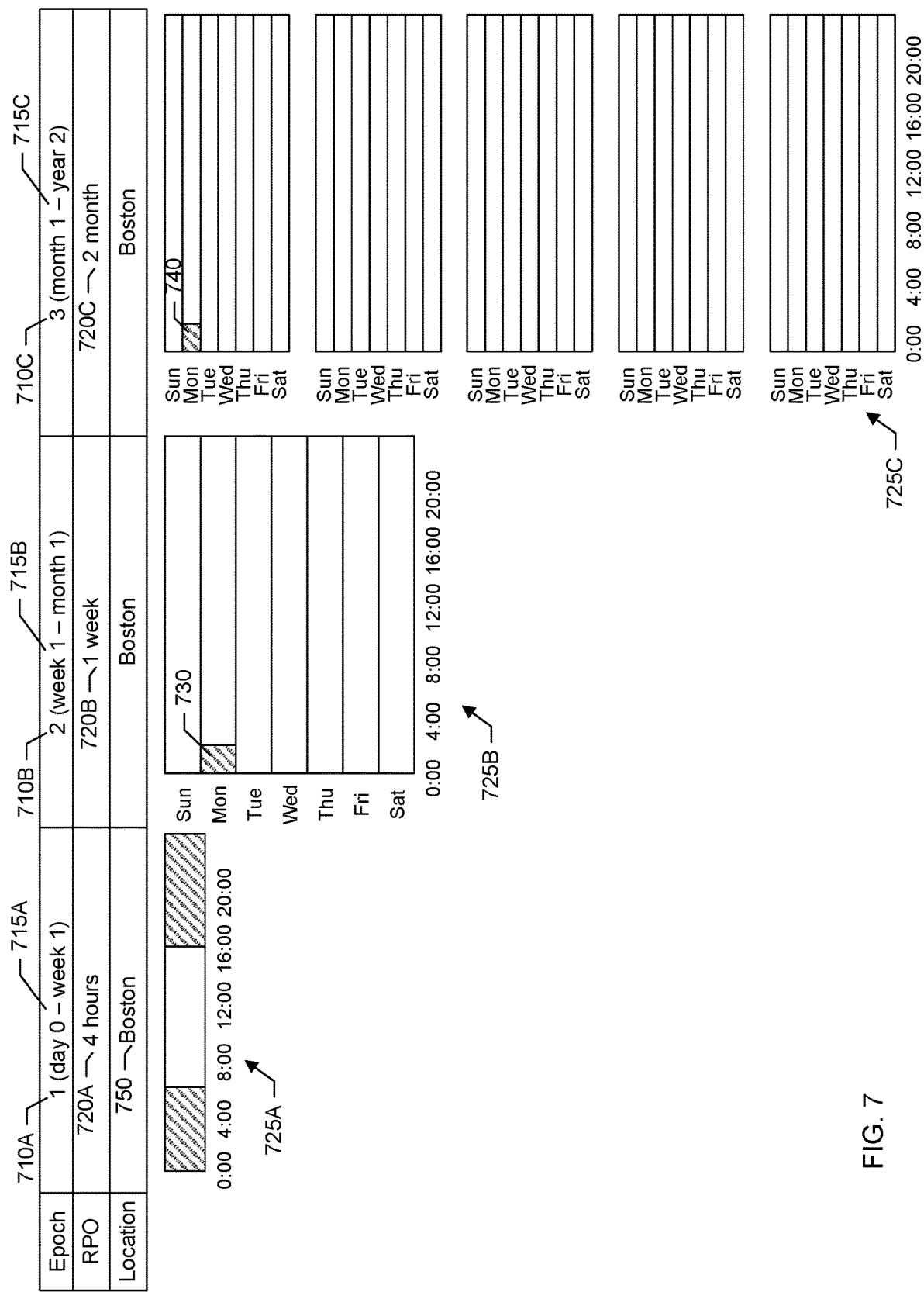
FIG. 7 shows an example of activity windows and epochs for determining retention time, under some embodiments.

Consider, as an example, that in or for a particular single location, an administrator wishes to keep a 4 hour recovery point objective (RPO) for the first week, then after a week up to a month, only keep the first copy on Monday. After a month, only keep the first Monday copy each month for two years. FIG. 7 shows a schematic diagram representing the policy where there are multiple epochs with their own activity windows.

In this example, as shown in the schematic of FIG. 7, three epochs have been defined including first, second, and third epochs 710A-C, respectively. Each epoch includes a specified duration or time period, a recovery point objective (RPO), and one or more activity windows.

Specifically, a duration 715A of the first epoch starts at day 0 and ends at the end of a first week (e.g., week 1). A duration 715B of the second epoch starts at the end of the first week and ends at the end of a first month (e.g., month 1). A duration 715C of the third epoch starts at the end of the first month and ends at the end of a second year (e.g., year 2).

An RPO 720A of the first epoch is 4 hours. An RPO 720B of the second epoch is 1 week. An RPO 720C of the third epoch is 2 months. An RPO specifies the maximum tolerated period in which data might be lost due to a disaster. An RPO is the point-in-time that can be recovered to in the event of the disaster. It is the amount of data loss with respect to time that is acceptable. A different RPO may be defined for each epoch.

For example, during the first epoch, an organization may decide that it will tolerate only a 4-hour loss of data. In other words, if during the first epoch a disaster occurred at 8:00 PM, the organization would be able to recover the data as of 4:00 PM that day. Having an RPO with a short length of time reduces data loss as compared to an RPO with a long length of time, but also increases the amount of computing resources required to maintain such an RPO. For example, the RPO with the shorter length of time will result in making backup copies more frequently as compared to the RPO with the longer length of time. Making copies consumes computing resources such as storage space and network bandwidth as data is copied from one location (e.g., source) to another location (e.g., destination).

Being able to define a different RPO for each epoch helps organizations to select the proper balance between data needs and available computing resources. For example, after the first week (or other duration), an organization may select a longer length of time for an RPO because it may decide that the relevance of the data may decrease over time. As a result, as time passes, the organization may wish to keep fewer and fewer copies. In other words, a number of copies maintained in a later epoch may be less than a number of copies maintained in an earlier epoch. The system allows administrators to selectively fine-tune which copies should be maintained into, past, or across one or more other epochs, and which copies should be deleted once an epoch has past or elapsed.

More particularly, as shown in the example of FIG. 7, a first or initial activity window 725A has been assigned to the first epoch. The first activity window may be referred to as a single day activity window. The first epoch would generate or result in the generation of multiple copies during valid working times based on the RPO of 4 hours.

Figure 8:
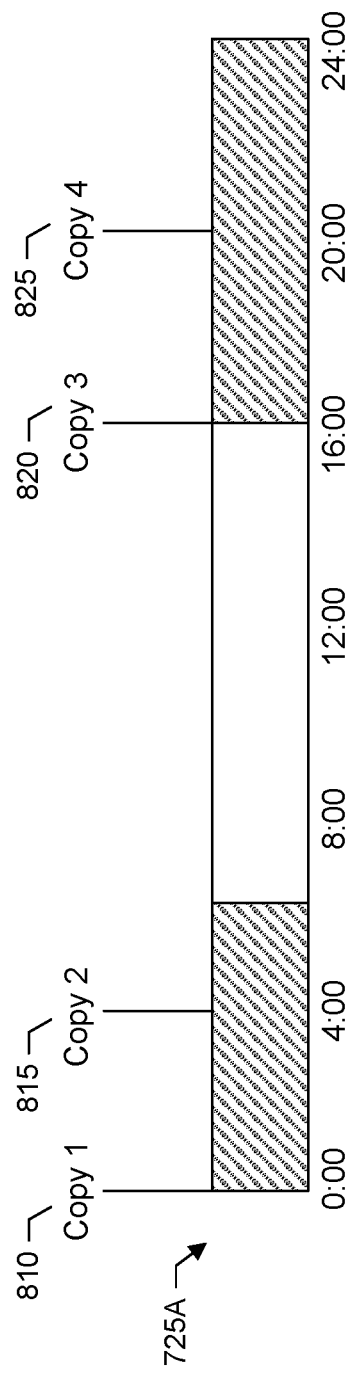
FIG. 8 shows an example of multiple copies being generated through an initial epoch according to an activity window, under some embodiments.

FIG. 8 shows the times over the activity window or course of a day at which copies would be made. As shown in the example of FIG. 8, a first copy 810 will be made at midnight at a beginning of a day. A second copy 815 will be made at 4:00 AM (04:00 hours) that day. A third copy 820 will be made at 4:00 PM (16:00 hours) that day. A fourth copy 825 will be made at 8:00 PM (20:00 hours) that day. As discussed, the activity window can specify the times of day that activity is permitted or not permitted to occur. In this example, activity (e.g., copy activity) is not permitted between the hours of 6:00 AM (06:00 hours) and 4:00 PM (16:00 hours) as indicated by the solid fill between 6:00 AM (06:00 hours) and 4:00 PM (16:00 hours). Activity is allowed outside these hours as indicated by the pattern of diagonal lines.

In a specific embodiment, in cases of a conflict between an activity window and an RPO, the activity window takes precedence. In other words, in this specific embodiment, if an RPO indicates that a copy is to be made at an interval that happens to fall within a period of the activity window in which no activity is allowed, the copy will be not be made. In another specific embodiment, the precedence can be configurable or over-ridden based on parameters such as the type of copy activity, application associated with the copy, role of user attempting to make the copy, other factors, or combinations of these. For example, the system may be configured such that a backup application will be allowed to make a backup copy according to an RPO even when a time of a backup as specified by the RPO falls within a period of the activity window in which copy activity is normally not allowed. Other types of copies, however, such as a copies for reporting purposes may be blocked during the period of the activity window in which copy activity is normally not allowed.

In continuing with the example above, at the end of the first or initial week (e.g., week 1), there would be 28 copies made (7 days×4 copies per day=28 copies). But looking at the single activity window and epoch would not indicate when the copy was no longer needed. To do that, when each copy is created, the system projects across all epochs for that location to determine the last time it is needed to satisfy an objective.

More specifically, referring back now to FIG. 7, a second activity window 725B has been assigned to the second epoch. The second activity window may be referred to as a single week activity window. A third activity window 725C has been assigned to the third epoch. The third activity window may be referred to as a five-week monthly activity window.

In the example shown in FIG. 7, the second activity window identifies a day and time 730 within the second epoch for which a copy from a previous epoch (e.g., first or initial epoch) will be retained past the previous epoch and into the second epoch. According to the second activity window, a copy made at the beginning of a Monday is to be retained past the previous epoch (e.g., initial epoch) while other copies (as indicated by the solid fill patterns of the second activity window) are to be deleted. Activity within the second epoch may include deleting copies according to the second activity window.

Similarly, the third activity window identifies a day and time 740 within the third epoch for which a copy from a previous epoch (e.g., second epoch) will be retained past the previous epoch and into the third epoch. According to the third activity window, a copy made at the beginning of a first Monday of the month is to be retained past the previous epoch (e.g., second epoch) while other copies (as indicated by the solid fill patterns of the second activity window) are to be deleted. Activity within the third epoch may include deleting copies according to the third activity window.

In other words, by looking at the copies made on any day except Monday, they are only needed until the end of the first epoch (1 week) because after the first epoch we only need Monday's copies. So the retention time would be creation time of the copy plus the first epoch end time (1 week). For Monday copies, each would need to be kept for at least until the end of the second epoch (1 month) because they are regulated by the second epoch activity window. So the retention time would be creation time plus second epoch end time (1 month). But if the copy on Monday was made between midnight and 2 am (e.g., first copy on first Monday of the month), it would need to be retained for two years. So the retention time would be creation time plus third epoch end time (2 years).

The activity windows allow for very precise and granular criteria of what copies should or should not be retained (e.g., retain the first copy made on a Monday). As another example, an organization may decide to keep emails for 7 years, but may also decide that not every copy needs to be kept for 7 years. For example, over the course of a day, an organization may perform any number of daily backups (e.g., 3, 4, 5, 6, 7, 8, 9, 10, or more than 10 backups). It can be very expensive to keep all of these backups indefinitely. Maintaining each of these backup copies over time can place an enormous load on the storage system. Thus, the organization may implement a policy where only backup copies made at midnight are retained for 7 years for data protection purposes. Other backup copies made at other times of the day may be retained for a duration less than 7 years (e.g., 1 week, 1 month, 2 months, and so forth). In an embodiment, the policy can be translated via the activity window and epoch definitions. While there may be some data loss as not every backup copy over the course of the day is kept, such a policy can help an organization to strike the appropriate balance between data protection and preservation needs and available computing resources.

An activity window may be defined as a day, a week, a month, or any other unit of time or multiple units of time as desired. Within that time frame of an activity window there can be any number of time ranges that mark the boundaries of when activity or processes (e.g., automated backup process) can run or not run. A time range may include explicit starting and ending times. A time range may include a start time and a duration to be calculated from the start time.

In an embodiment, a location 750 is an important aspect or criteria of activity windows and epochs, because it is assumed that copies cannot bounce from location to location easily. In this embodiment, the system assumes copies are created somewhere and need to stay there until they are no longer needed.

In a specific embodiment, a method includes receiving a definition for a first activity window specifying periods of allowable copy activity, and a first recovery point objective; receiving a definition for a first epoch specifying a first duration; associating the first activity window to the first epoch; receiving a definition for a second activity window specifying a particular period from the first epoch for which a copy from the particular period is to be retained past the first epoch and into the second epoch; receiving a definition for a second epoch specifying a second duration; associating the second activity window to the second epoch; allowing a copy to be made during the first epoch according to the first activity window and first recovery point objective; determining whether the copy was made in a period that corresponds to the particular period from the first epoch for which a copy is to be retained past the first epoch and into the second epoch; if the copy was made in the period that corresponds to the particular period from the first epoch, adding the second duration to a creation time of the copy to obtain a date after which the copy should be deleted; if the copy was not made in the period that corresponds to the particular period from the first epoch, adding the first duration to the creation time of the copy to obtain the date; and associating the date to delete the copy with the copy.

The epochs may be consecutive, sequential, in series, or one after the other. A duration of an epoch may be the same as or different from a duration of another epoch. For example, a duration of an initial epoch (e.g., first epoch) may be less than a duration of a next epoch (e.g., second epoch), after the initial epoch. A duration of the next epoch may be greater than the duration of the initial epoch. Durations of epochs may increase moving forward with time. Durations of epochs may decrease moving forward with time. In the example shown in FIG. 7, the epochs have been defined as having durations of a week, month, and two years. It should be appreciated, however, that these durations are merely for example and an epoch may be defined as having any length of time or any number of time units. Examples of time units include days, weeks, months, and years. Epochs may be defined as spanning 10 days, 40 days, 50 days, two weeks, three weeks, two months, three months, one year, three years, four years, five years, six years, seven years, or any other length of time as desired. In determining the durations to assign to the epochs, an organization may weigh factors such as statutory regulations governing the preservation of electronic records for at least certain duration, available computing resources (e.g., storage space), value of historical data, likelihood of disasters, and other factors.

Figure 9:
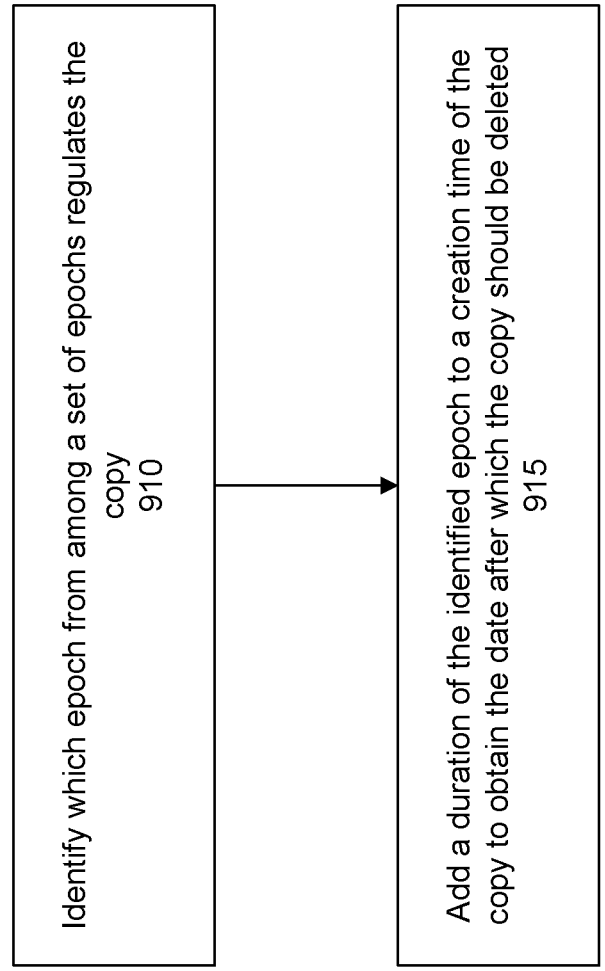
FIG. 9 shows further detail of a process for calculating final data retention dates, under some embodiments.

FIG. 9 shows further detail of a flow for projecting across epochs to calculate a date after which a copy should be deleted. In brief, in a step 910, the retention calculation unit identifies which epoch from among a set of epochs regulates, controls, or governs the copy. In a step 915, upon the identification, a duration of the identified epoch is added to a creation time of the copy to obtain the date after which the copy should be deleted.

In a specific embodiment, there can be one or more retention policies specifying that copies created under various particular contexts are to be regulated by various particular epochs. Identifying the epoch may include determining a context under which a copy was created, and evaluating the policy or, more particularly, activity windows of subsequent epochs, to cross-reference a corresponding context and associated epoch. In this specific embodiment, the copy retention calculation unit can include a context generation or derivation subunit. The context generation subunit can receive as input the time and date that a copy was made. The context generation subunit can process these time-based attributes to identify the context under which the copy was made. The context can include metadata associated with the copy including parameters associated with time, parameters associated with geographical location, or both. The context can describe with respect to time and geographical location, when and where a copy was made.

The context or associated metadata may specify, for example, the particular day of the week the copy was created (e.g., Sunday, Monday, Tuesday, Wednesday, Thursday, Friday, or Saturday), the ordinal number of the copy with respect to other copies created on the day (e.g., first copy of the day, second copy of the day, third copy of the day, fourth copy of the day, and so forth), the particular day of the month the copy was created (e.g., first Monday of the month, second Monday of the month, first Tuesday of the month, first day of the month, second day of the month, last day of the month, and so forth), whether the copy was created on a weekday, whether the copy was created on a weekend, whether the copy was created on a business day, geographical location at which the copy was made (e.g., Boston, New York, or Philadelphia), other context parameters, or combinations of these.

The time and date that a copy was made may be analyzed in conjunction with a calendar to identify the context under which the copy was made. For example, the copy creation time of 00:00 hours (midnight) on Jan. 6, 2013, may be cross-referenced against a calendar to determine that Jan. 6, 2013 corresponds to a Monday and is the first Monday of the month. The time and date that a copy was made may be analyzed in conjunction with other copies made on that same day to determine the ordinal number of the copy (e.g., first copy of the day, second copy of the day, third copy of the day, or fourth copy of the day). The copies made on a particular day may be sorted according to a time the copy was made (e.g., earliest to latest time) in order to assign ordinal numbers to the copies. For example, the copies on Monday may be sorted according to time of copy from earliest to latest time to generate an ordered list. Each copy may then be assigned an ordinal number based on their position in the ordered list. For example, a copy in the initial position of the ordered list may be identified as the first copy of the day. A copy in the ordered list positioned immediately after the initial position may be identified as the second copy of the day, and so forth.

Individual pieces of recognized context units may be combined to form a context composite. For example, the ordinal number of a copy (e.g., first copy of the day) may be combined with a day that the copy was made (e.g., Monday) to form a context composite associated with the copy.

Upon determining or recognizing the context under which the copy was created, a retention policy can be reviewed or, more particularly, activity windows of subsequent epochs can be reviewed, to compare or cross-reference a corresponding context specified by an activity window and thus identify the associated epoch regulating the copy. For example, as shown in the example of FIG. 7 and described in the accompanying discussion, a retention policy based on the various activity windows is to keep a 4-hour RPO for the first week. Then after a week up to a month, only keep the first copy on Monday. After a month, only keep the first Monday copy each month for two years. Thus, in this example, the first copies made on the first Mondays of each month are regulated by the third epoch which has a duration of 2 years. The first copies made on Mondays that are not the first Mondays of each month are regulated by the second epoch which has a duration of 1 month. The remaining copies are regulated by the first epoch which has a duration of 1 week.

In a specific embodiment, upon or in conjunction with a copy being created, the system examines, projects, or looks across one or more subsequent epochs and corresponding activity windows to determine which epoch regulates the copy. The examination may include obtaining attributes associated with the copy such as the day the copy was created and scanning one or more subsequent epochs to determine whether a set of corresponding attributes can be found in the one or more subsequent epochs indicating that the copy is to be retained into the one or more subsequent epochs.

In a specific embodiment, calculating the final retention date is performed at the time the copy is created based on activity window definitions. This allows for good planning and forecasting of storage needs as compared to reviewing at a much later date whether or not something created well into the past can be deleted. In another specific embodiment, calculating the final retention date or updating the calculation is performed well after the copy has been made. For example, in this specific embodiment, a final retention date may be calculated and associated with a file in conjunction with creating the file. After the final retention date has been calculated and associated with the file, an organization may define a new activity window specifying criteria for deletion of files. The system can reassess the file to determine whether the previously created file is subject to the new activity window definition. If so, the system can recalculate an updated final retention date and replace the previously associated final retention date with the updated final retention date. For example, an organization may initially decide to retain for 1 year all copies created on a Monday. Subsequently, the organization may then decide that only copies created on a fourth Monday of the month need to be retained for 1 year. This flexibility in calculating final retention dates allows the system to adapt to the changing needs of an organization.

In another specific embodiment, different types of copies may be regulated by a different set of epochs and activity windows as compared to other types of copies. For example, an organization may desire that copies made for analytical purposes should not be kept as long as copies made for backup or data protection purposes. Thus, shorter and smaller activity windows may be defined for the copies made for analytical purposes in order to prune these copies out quicker as compared to copies made for backup or data protection purposes.

In a specific embodiment, a method includes defining a set of epochs, each epoch including a duration; defining a set of activity windows based on a data retention policy having context information for retaining specific copies, the set of activity windows including an initial activity window specifying times during a day when copying is allowed; assigning the activity windows to the epochs; allowing copies to made during an initial epoch according to the initial activity window assigned to the initial epoch; calculating, for each copy, a date after which a copy should be deleted; and associating the date after which the copy should be deleted to the copy. In this specific embodiment, the calculating includes determining a context under which the copy was created; comparing the context to the activity windows to identify an epoch regulating the copy; and adding a duration of the identified epoch to a creation time of the copy to obtain the date.

In another specific embodiment, a method includes defining an allowable set of activity windows specifying when copies of data should be created; defining a set of epochs including an initial epoch, and zero or more subsequent epochs, each epoch specifying a retention duration and allowable activity window; defining a retention policy specifying that copies created during a particular time period of the allowable activity window are to be retained past a retention duration of the initial epoch; determining whether a copy was created during the particular time period specified in the data retention policy; if the copy was not created during the particular time period, adding the retention duration of the initial epoch to a creation time of the copy to obtain a data after which the copy should be deleted; if the redundant copy was created during the particular time period, adding a retention duration of a subsequent epoch to the creation time to obtain the date; and associating the date to delete the copy with the copy. The subsequent epoch may be immediately after the initial epoch. The subsequent epoch may not be immediately after the initial epoch. There may be one or more other intermediate epochs between the initial and subsequent epochs.

Figure 10:
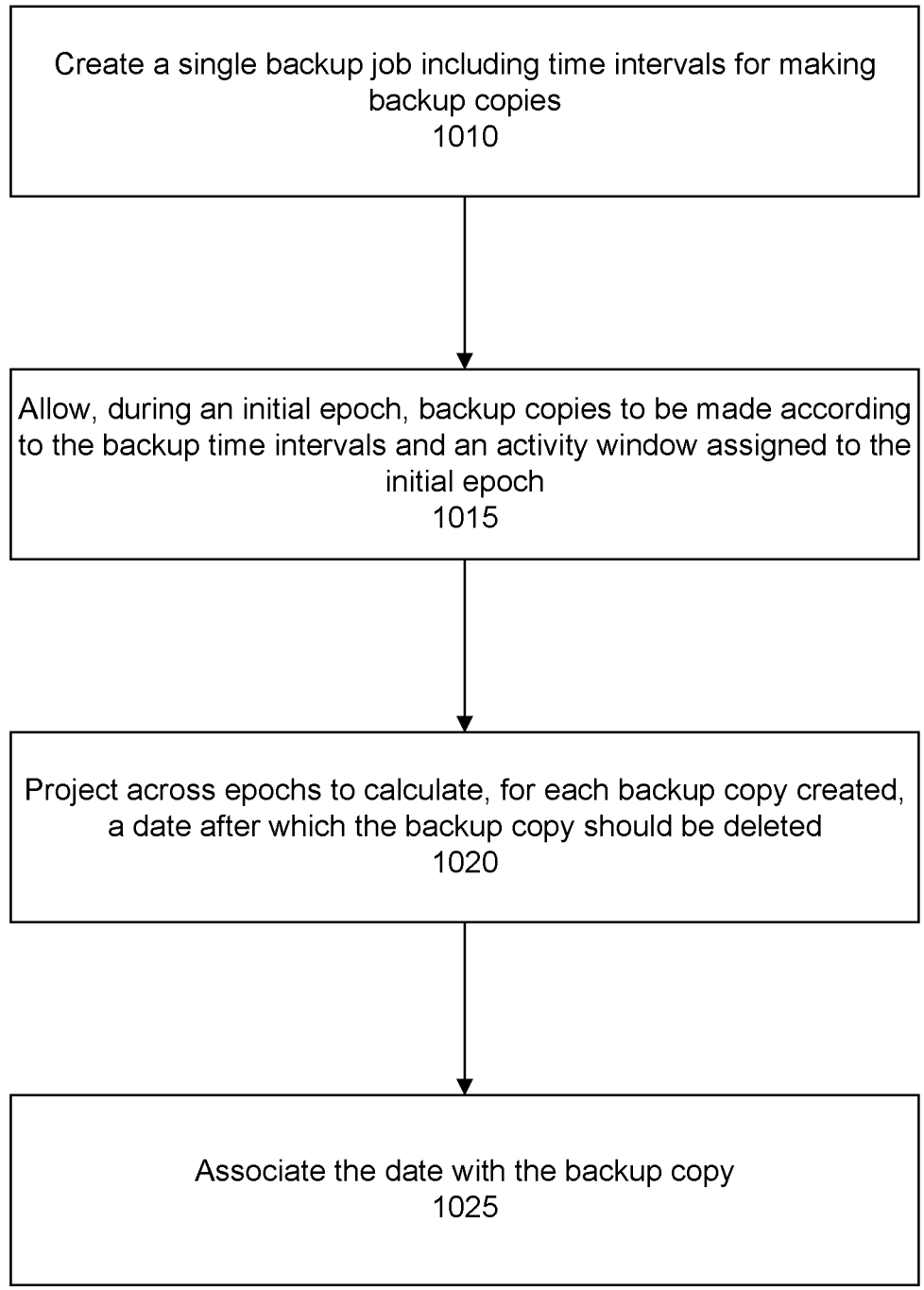
FIG. 10 shows a process where different retention times can be calculated for backup copies associated with the same single backup job, under some embodiments.

FIG. 10 shows a flow for making and maintaining backups according to a specific embodiment. In a step 1010, a single backup job is created where the single backup job includes intervals for making backup copies. In a step 1015, backup copies are made during an initial epoch according to the backup time intervals and an activity window assigned to the initial epoch. In a specific embodiment, the activity window over-rides or takes precedence over a backup interval where a time period of the activity window in which activity is not permitted conflicts with the backup interval.

In a step 1020, for each backup copy, a retention date is calculated. The calculation includes projecting across epochs to identify that epoch which regulates a particular backup copy. The projection may be as described above (see, e.g., step 230, FIG. 2). In a step 1025, the date after which the backup copy may be deleted is associated with the backup copy.

The techniques discussed above for determining retention time allows different backup copies to have different retention durations even though each backup copy may be associated with a single backup job. In other words, rather than creating multiple backup jobs each having different retention durations, there can be a single backup job that provides for different retention durations. It can be much easier and less complex to manage a single backup job as compared to multiple backup jobs. For example, running multiple backup jobs to achieve different retention durations with each backup job can impose a significant computing burden on the system.

Figure 11:
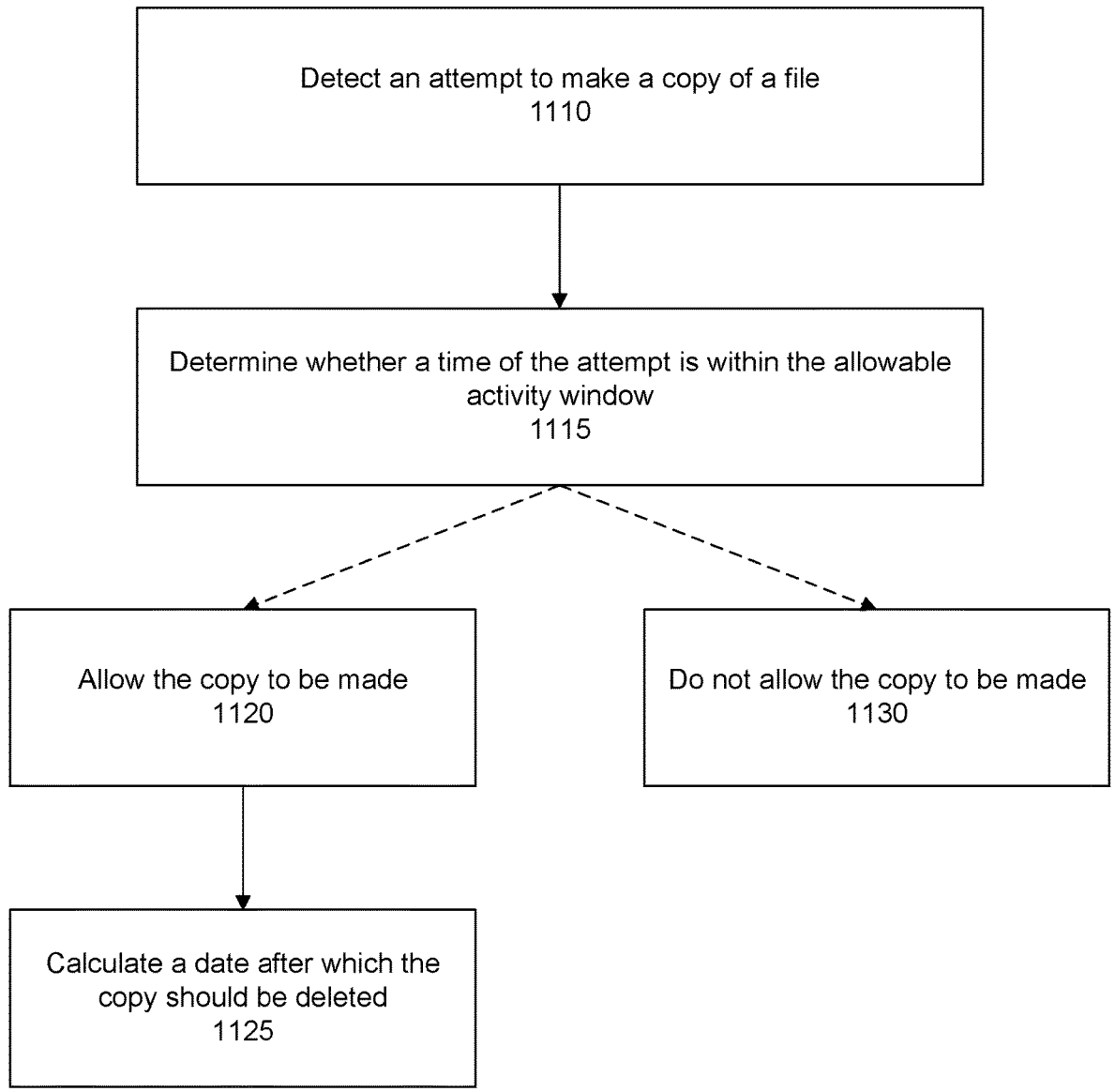
FIG. 11 shows a process for enforcement of an activity window, under some embodiments.

FIG. 11 shows a flow for enforcing activity windows according to a specific embodiment. In a step 1110, the system detects an attempt to make a copy of a file. The attempt may be from an application program such as a backup program attempting to make a backup copy of a file. The attempt may be from a user attempting to make a copy of the file such as for backwards compatibility testing. In a step 1115 a determination is made as to whether a time of the attempt is within a range of allowable times as specified by the allowable activity window. If the time is within the allowable activity window, in a step 1120, the system allows the copy to be made and calculates a date on or after which the copy should be deleted (step 1125). If the time is outside the allowable activity window, in a step 1130, the system does not allow the copy to be made.

In another specific embodiment, the system can prompt a user to confirm the retention date that has been calculated. For example, in situations where the user manually creates a copy of a file, the system calculates the retention date, and displays to the user a dialog box including a message indicating the calculated retention date (e.g., "This copy of the file will be automatically deleted on Oct. 7, 2027."). The dialog box may include a button that the user can click to indicate confirmation of the date and another button to override the date (e.g., "Please click 'OK' to accept the retention date or click 'Override' to input a new date."). If the user wishes to override the calculated date by clicking the 'Override' button, the system displays an input box for the user to manually input a new date (e.g., "Feb. 3, 2023"). Upon receiving the new date, the system associates the manually inputted new date with the copy rather than the system calculated date. Being able to override the date provides for a great deal of flexibility and allows the system to adapt to specific situations.

In a specific embodiment, a method includes defining an allowable set of activity windows specifying when copies of data should be created; defining a plurality of epochs comprising an initial epoch, and subsequent epochs, each epoch specifying a retention duration, and allowable activity window; defining a retention policy specifying that copies created during a particular time period of the allowable activity window are to be retained past a retention duration of the initial epoch; determining by a processing component whether a copy was created during the particular time period specified in the retention policy; if the copy was not created during the particular time period, adding the retention duration of the initial epoch to a creation time of the copy to obtain a date after which the copy should be deleted; if the copy was created during the particular time period, adding a retention duration of a subsequent epoch to the creation time to obtain the date; and associating the date to delete the copy with the copy.

A first activity window may specify starting and ending times over a course of a day within which copy activity is allowed. The retention duration of the initial epoch may be the same as or different from the retention duration of the subsequent epoch. The subsequent epoch may be immediately after the initial epoch. The subsequent epoch may not be immediately after the initial epoch.

In an embodiment, the method further includes detecting, during the initial epoch, an attempt to make a copy of a file; comparing a time of the attempt with an allowable activity window associated with the initial epoch to determine if the time is within the allowable activity window; if the time of the attempt is within the allowable activity window, calculating a date after which the copy of the file should be deleted; and if the time of the attempt is outside the allowable activity window, not allowing the copy of the file to be made.

In another specific embodiment, there is a system for calculating final data retention dates, the system comprising: a processor-based system executed on a computer system and configured to execute instructions comprising: defining an allowable set of activity windows specifying when copies of data should be created; defining a plurality of epochs comprising an initial epoch, and subsequent epochs, each epoch specifying a retention duration, and allowable activity window; defining a retention policy specifying that copies created during a particular time period of the allowable activity window are to be retained past a retention duration of the initial epoch; determining whether a copy was created during the particular time period specified in the retention policy; if the copy was not created during the particular time period, adding the retention duration of the initial epoch to a creation time of the copy to obtain a date after which the copy should be deleted; if the copy was created during the particular time period, adding a retention duration of a subsequent epoch to the creation time to obtain the date; and associating the date to delete the copy with the copy.

In another specific embodiment, there is a computer program product, comprising a non-transitory computer-readable medium having a computer-readable program code embodied therein, the computer-readable program code adapted to be executed by one or more processors to implement a method comprising: defining an allowable set of activity windows specifying when copies of data should be created; defining a plurality of epochs comprising an initial epoch, and subsequent epochs, each epoch specifying a retention duration, and allowable activity window; defining a retention policy specifying that copies created during a particular time period of the allowable activity window are to be retained past a retention duration of the initial epoch; determining whether a copy was created during the particular time period specified in the retention policy; if the copy was not created during the particular time period, adding the retention duration of the initial epoch to a creation time of the copy to obtain a date after which the copy should be deleted; if the copy was created during the particular time period, adding a retention duration of a subsequent epoch to the creation time to obtain the date; and associating the date to delete the copy with the copy.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   defining an allowable set of activity windows specifying when copies of data are allowed to be created;
   defining a plurality of epochs comprising an initial epoch, and subsequent epochs, each epoch specifying a retention duration, and allowable activity window, wherein an epoch is a period of time that begins at a first time and ends at a second time, different from the first time, and a subsequent epoch begins at the second time;
   defining a retention policy specifying that copies created during a particular time period of the allowable activity window are to be retained past a retention duration of the initial epoch;
   detecting a first attempt by a user to create a copy outside the allowable activity window;
   blocking the first attempt;
   detecting a second attempt by the user to create the copy within the allowable activity window;
   allowing the second attempt;
   upon allowing the second attempt, determining by a processing component whether the copy was created during the particular time period specified in the retention policy;
   when the copy was not created during the particular time period, adding the retention duration of the initial epoch to a creation time of the copy to obtain a date after which the copy should be deleted;
   when the copy was created during the particular time period, adding a retention duration of the subsequent epoch to the creation time to obtain the date; and
   associating the date to delete the copy with the copy, wherein the initial epoch specifies a first retention duration, and the subsequent epoch specifies a second retention duration, different from the first retention duration, and the method comprises:
   defining a single backup job specifying time intervals for creating backup copies;
   allowing the single backup job to run to create first and second backup copies;
   determining that the first backup copy was created during the particular time period;
   determining that the second backup copy was not created during the particular time period;
   adding the first retention duration to a creation time of the first backup copy to obtain a date after which the first backup copy should be deleted; and
   adding the second retention duration to a creation time of the second backup copy to obtain a date after which the second backup copy should be deleted, the first and second backup copies thereby having different retention durations, but having been created from the single backup job.

2. The method of claim 1 wherein a first activity window specifies starting and ending times over a course of a day within which copy activity is allowed.

3. The method of claim 1 wherein the retention duration of the initial epoch is different from the retention duration of the subsequent epoch.

4. The method of claim 1 comprising:
   detecting, during the initial epoch, an attempt to make a copy of a second file;
   comparing a time of the attempt with an allowable activity window associated with the initial epoch to determine if the time is within the allowable activity window;
   when the time of the attempt is within the allowable activity window, calculating a date after which the copy of the second file should be deleted; and
   when the time of the attempt is outside the allowable activity window, not allowing the copy of the second file to be made.

5. A system for calculating final data retention dates, the system comprising:
   a processor-based system executed on a computer system and configured to execute instructions comprising:
   defining an allowable set of activity windows specifying when copies of data are allowed to be created;
   defining a plurality of epochs comprising an initial epoch, and subsequent epochs, each epoch specifying a retention duration, and allowable activity window, wherein an epoch spans a period of time, and is in series with respect to another epoch;
   defining a retention policy specifying that copies created during a particular time period of the allowable activity window are to be retained past a retention duration of the initial epoch;
   detecting a first attempt by a user to create a copy outside the allowable activity window;
   blocking the first attempt;
   detecting a second attempt by the user to create the copy within the allowable activity window;
   allowing the second attempt;
   upon allowing the second attempt, determining whether the copy was created during the particular time period specified in the retention policy;
   when the copy was not created during the particular time period, adding the retention duration of the initial epoch to a creation time of the copy to obtain a date after which the copy should be deleted;
   when the copy was created during the particular time period, adding a retention duration of a subsequent epoch to the creation time to obtain the date; and
   associating the date to delete the copy with the copy, wherein the initial epoch specifies a first retention duration, and the subsequent epoch specifies a second retention duration, different from the first retention duration, and the processor-based system is configured to execute instructions comprising:
   defining a single backup job specifying time intervals for creating backup copies;
   allowing the single backup job to run to create first and second backup copies;
   determining that the first backup copy was created during the particular time period;

determining that the second backup copy was not created during the particular time period;

adding the first retention duration to a creation time of the first backup copy to obtain a date after which the first backup copy should be deleted; and adding the second retention duration to a creation time of the second backup copy to obtain a date after which the second backup copy should be deleted, the first and second backup copies thereby having different retention durations, but having been created from the single backup job.

6. The system of claim 5 wherein a first activity window specifies starting and ending times over a course of a day within which copy activity is allowed.

7. The system of claim 5 wherein the retention duration of the initial epoch is different from the retention duration of the subsequent epoch.

8. The system of claim 5 wherein the subsequent epoch is immediately after the initial epoch.

9. The system of claim 5 wherein the subsequent epoch is not immediately after the initial epoch.

10. The system of claim 5 wherein the processor-based system is configured to execute instructions comprising:

detecting, during the initial epoch, an attempt to make a copy of a second file;

comparing a time of the attempt with an allowable activity window associated with the initial epoch to determine if the time is within the allowable activity window;

when the time of the attempt is within the allowable activity window, calculating a date after which the copy of the second file should be deleted; and when the time of the attempt is outside the allowable activity window, not allowing the copy of the second file to be made.

11. A computer program product, comprising a non-transitory computer-readable medium having a computer-readable program code embodied therein, the computer-readable program code adapted to be executed by one or more processors to implement a method comprising:

defining an allowable set of activity windows specifying when copies of data should be created;

defining a plurality of epochs comprising an initial epoch, and subsequent epochs, each epoch specifying a retention duration, and allowable activity window, wherein an epoch is defined as spanning a duration of time, and a subsequent epoch starts at an end of a previous epoch;

defining a retention policy specifying that copies created during a particular time period of the allowable activity window are to be retained past a retention duration of the initial epoch;

detecting a first attempt by a user to create a copy outside the allowable activity window;

blocking the first attempt;

detecting a second attempt by the user to create the copy within the allowable activity window;

allowing the second attempt;

upon allowing the second attempt, determining whether the copy was created during the particular time period specified in the retention policy;

when the copy was not created during the particular time period, adding the retention duration of the initial epoch to a creation time of the copy to obtain a date after which the copy should be deleted;

when the copy was created during the particular time period, adding a retention duration of a subsequent epoch to the creation time to obtain the date; and associating the date to delete the copy with the copy, wherein the initial epoch specifies a first retention duration, and the subsequent epoch specifies a second retention duration, different from the first retention duration, and the method comprises:

defining a single backup job specifying time intervals for creating backup copies;

allowing the single backup job to run to create first and second backup copies;

determining that the first backup copy was created during the particular time period;

determining that the second backup copy was not created during the particular time period;

adding the first retention duration to a creation time of the first backup copy to obtain a date after which the first backup copy should be deleted; and adding the second retention duration to a creation time of the second backup copy to obtain a date after which the second backup copy should be deleted, the first and second backup copies thereby having different retention durations, but having been created from the single backup job.

12. The computer program product of claim 11 wherein a first activity window specifies starting and ending times over a course of a day within which copy activity is allowed.

13. The computer program product of claim 11 wherein the retention duration of the initial epoch is different from the retention duration of the subsequent epoch.

14. The computer program product of claim 11 wherein the method comprises:

detecting, during the initial epoch, an attempt to make a copy of a second file;

comparing a time of the attempt with an allowable activity window associated with the initial epoch to determine if the time is within the allowable activity window;

when the time of the attempt is within the allowable activity window, calculating a date after which the copy of the second file should be deleted; and when the time of the attempt is outside the allowable activity window, not allowing the copy of the second file to be made.

* * * * *